Dec. 17, 1935. V. P. WILLIAMS 2,024,410
UNIVERSAL JOINT
Filed April 5, 1934 4 Sheets-Sheet 2
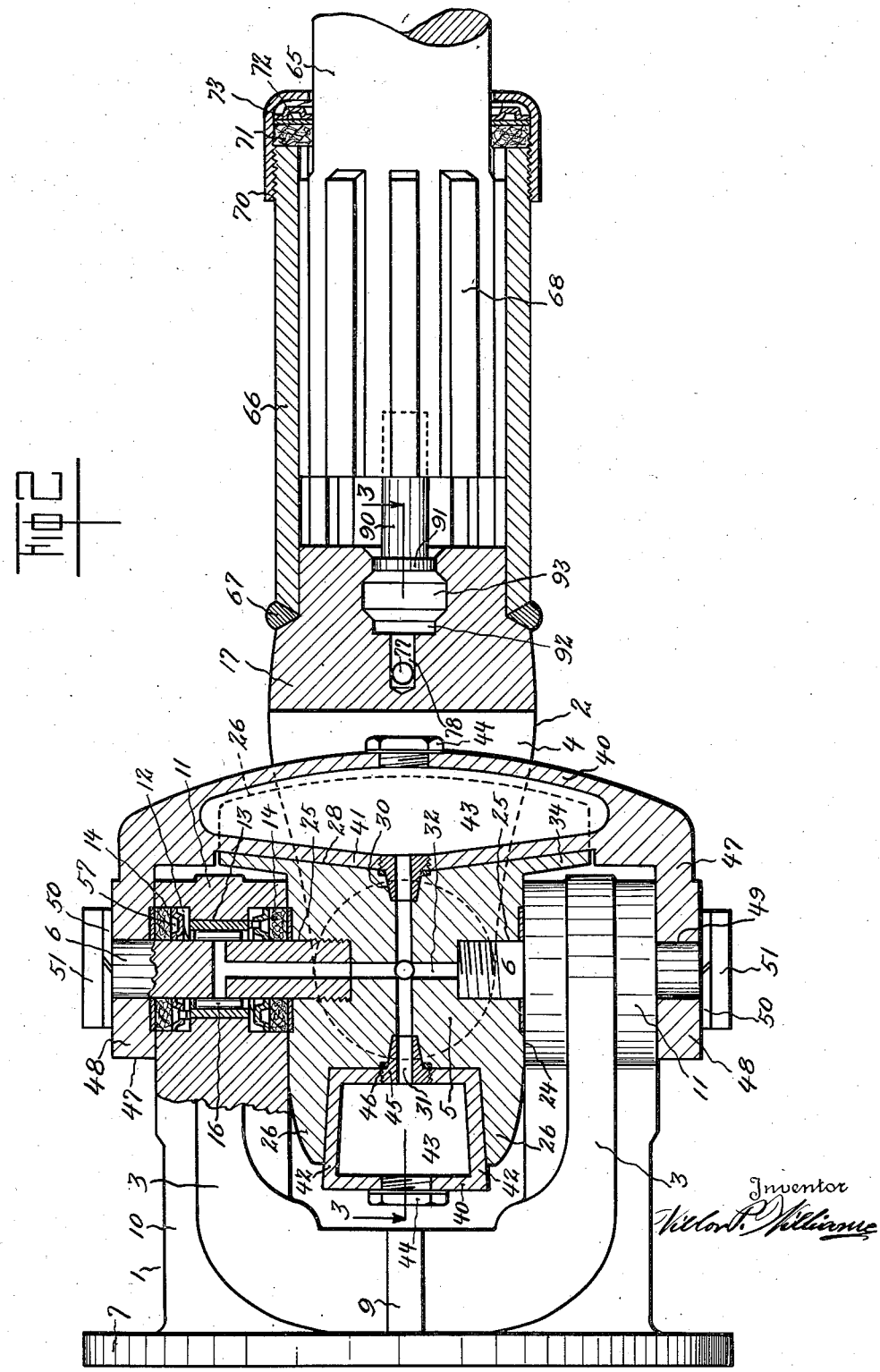
Inventor
Victor P. Williams

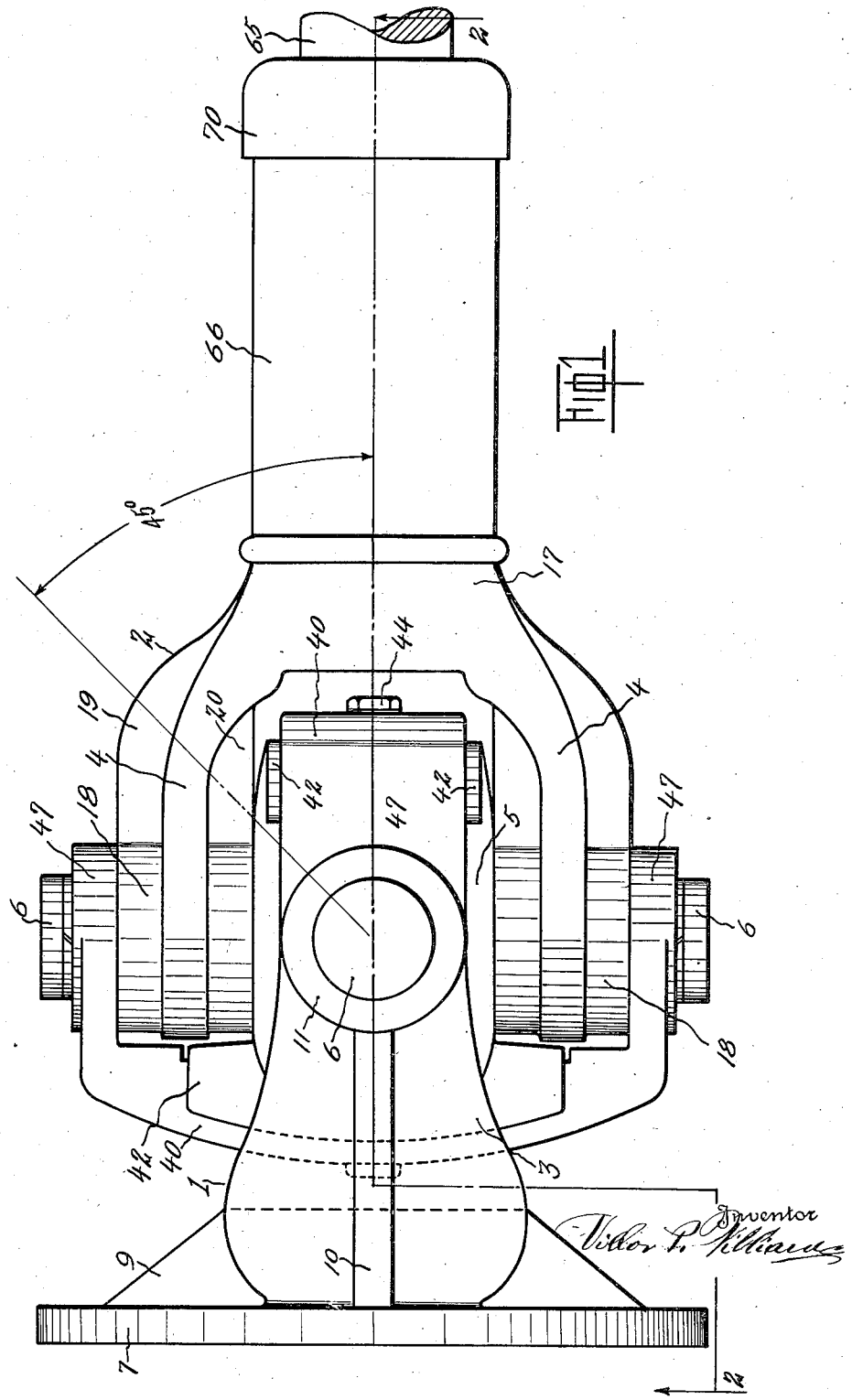

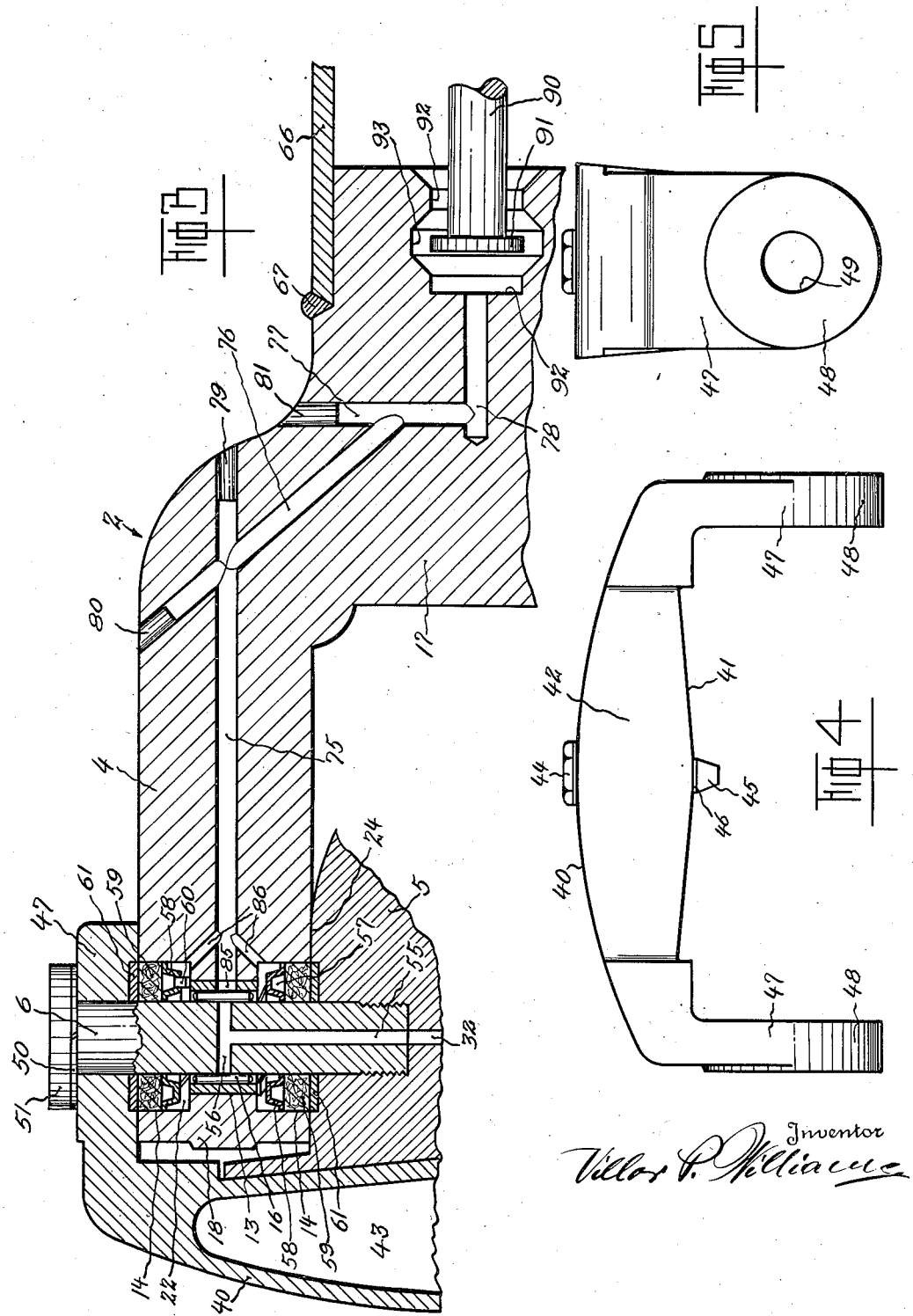

Dec. 17, 1935.  V. P. WILLIAMS  2,024,410
UNIVERSAL JOINT
Filed April 5, 1934     4 Sheets-Sheet 4

Inventor
Victor P. Williams

Patented Dec. 17, 1935

2,024,410

UNITED STATES PATENT OFFICE 2,024,410

UNIVERSAL JOINT

Villor P. Williams, Baltimore, Md., assignor to Estelle P. Williams, Baltimore, Md.

Application April 5, 1934, Serial No. 719,212

25 Claims. (Cl. 64—17)

This invention relates to improvements in universal joints and more particularly to a universal joint of the four point contact type.

A common deficiency in joints of this type resides in the fact that the arms of the joint members spread apart in the operation of the joint regardless of the degree of angularity at which the joint operates resulting ultimately in the breakage of one or more of these arms and the natural collapse of the joint. This spreading apart of the arms in the joint becomes more pronounced the greater the degree of angularity at which the joint operates. Consequently with joints of this type the efficiency is greatest the smaller the angle at which they are employed and vice versa. Another problem created by this spreading apart of the arms is in the proper lubrication of the bearing trunnions of the joint and in the packing assemblies therefor.

It is accordingly an object of this invention to provide in universal joints of this type a bridge member mounted on opposite sides of the trunnions block so arranged as to span the arms of each of the yokes of the joint to prevent any tendency of the same to spread apart while in use.

A further object of this invention is to form a lubricant reservoir in each of said bridge members along with the provision of suitable means for conducting lubricant to the bearings of the joint.

A still further object of this invention is the provision of novel packing means automatically adjustable for the taking up of wear and so mounted in the joint bearings as to retain at all times this maximum efficiency.

Another object of this invention resides in the provision of means in the arms of one of the yokes or joint elements to conduct lubricant from the bridge reservoirs to the splined connection of a shaft member with said yoke including automatic pressure release and feed means for controlling the lubricant in said splined connection.

Other objects of this invention are to provide in a universal joint of this type a simple construction of maximum strength and efficiency in operation, and wherein the bearing surfaces which are subject to wear, are maintained in a perfectly lubricated condition. The universal joint as a whole being especially suited to the requirements of motor vehicle service.

Other objects and attendant advantages will be appreciated by those skilled in the art as the invention becomes better understood by references to the following description when considered in connection with the accompanying drawings, in which:—

Fig. 1 is an elevational or plan view of the universal joint.

Fig. 2 is a sectional view taken on line 2—2, Fig. 1.

Fig. 3 is a sectional view taken on line 3—3, Fig. 2.

Fig. 4 is an elevational view of the bridge member.

Fig. 5 is an end elevational view of the same bridge member.

Figure 6:
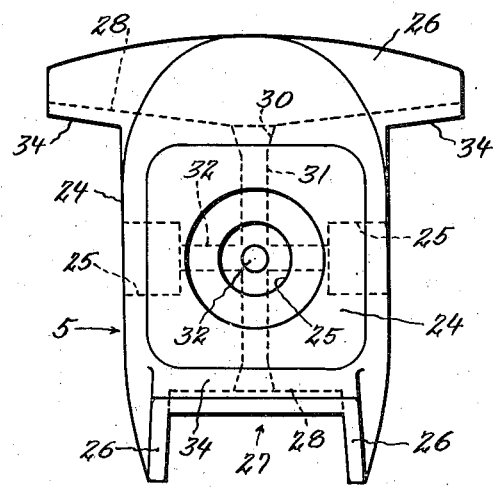
Fig. 6 is an elevational view of the trunnion block.

Referring to Fig. 1 there is shown a preferred form of the universal joint comprising the two yokes or joint elements 1 and 2 provided respectively with integrally spaced arms 3 and 4. The arms 3 and 4 of the joint elements are arranged at right angles to each other in the manner well known there being interposed therebetween a trunnion block 5, the whole being held in assembled relation by trunnions 6 in the manner to be hereinafter described.

The joint element 1 is provided with a circular attaching flange 7 adapted for connection by bolts to a similar cooperating flange of a shaft member (not shown) and a body portion formed with the integral arms 3, the whole being rigidly braced by the ribs 9 and 10 to form an exceedingly rigid joint element of great strength. The arms 3 are provided at their ends with a boss 11, each having formed therein a transverse opening 12, co-axially arranged with respect to each other. Each opening 12 is provided with a central portion 13 of reduced diameter, the enlarged openings on each side thereof defining packing chambers 14. Fitted in the central portion 13 of the opening 12 in each arm 3 and carried thereby is a needle roller bearing 16 that is adapted for oscillatory movement on the trunnions 6 extending therethrough. It is to be understood that while in the preferred form an anti-friction roller bearing has been shown it may be desirable in many cases to substitute for the same either a plain bearing bushing or ball bearing construction.

The other cooperating joint element or yoke 2 comprises a cylindrical shank 17 and the spaced arms 4 integral therewith, each arm being provided with a boss 18, the arms of the element being braced by the ribs 19 and 20 to render the same rigid and of great strength. Each of the bosses 18 are provided with transverse openings 22, see Fig. 3, identical in all respects to the openings 12 in the bosses 11 of the arms 3, and in which are finally mounted the needle roller bearings 16.

The arms 3 of the joint element 1 and the arms 4 of the joint element 2 are arranged to extend towards and at right angles to each other and confine therebetween a trunnion block 5. The trunnion block 5 is formed substantially in the shape of a four sided block, each side being identical and having a flat face 24. Formed on each side of the trunnion block 5 are openings 25 which extend partially inwardly into the block. The openings 25 on opposed faces of the block being co-axially disposed with respect to each other and all arranged in the same transverse plane, all as clearly shown in Fig. 6. As will be observed the trunnion block 5 is so positioned between the pair of arms 3 and 4 as to have the openings 25 in the block register co-axially with the openings 12 and 22, respectively of the arms 3 and 4.

On each end of the trunnion block 5 are integrally formed walls 26, the walls at one end of the block being arranged at right angles to the walls on the other end of the block. The walls 26 define with the ends of the block, channels 27 that are open from end to end. Each end of the block constituting the bottom 28 of the channel is longitudinally depressed substantially in the shape of a wide V, while the inner sides of the walls 26 are given a slight inward inclination, all as clearly shown in Fig. 6. Formed in the apex of the V-bottom 28 of each of the channels 27 is a conical opening 30 extending into the interior of the block, which openings 30 are connected by the passage 31. Communicating the passage 31 with each of the openings 25, preferably centrally thereof, are passages 32 which are all substantially in the same plane. The bottoms 28 of the channels 27 are preferably extended as at 34 beyond the sides 24 of the trunnion block as well as the connected walls 26 thereof, for a purpose to be hereinafter described. In some cases it may be desirable to have the bottoms of the channels 28 formed flat.

Adapted to be seated in each of the channels 27 is a bridge member 40. Each bridge member is formed with a bottom 41 corresponding in shape to the bottom 28 of the channel 27, and side walls 42 that have the same inclination as the inner sides of the channel walls 26, whereby the bridge member is adapted to snugly seat within the channel 27. The interior of each of the bridge members is hollow to form a lubricant reservoir 43, which may be filled by removing the filler plug 44 provided on the top thereof. Attached to the bottom 41 of each bridge member and adapted to intimately engage the conical openings 30 in the trunnion block 5 are conical discharge nipples 45. A packing ring 46 surrounds the bottom of each nipple 45 to prevent any leakage of lubricant when the same is fitted in its associated openings 30.

Integral with each end of each of the bridge members 40 is a trunnion support 47, formed on the end thereof with a boss 48, the trunnion supports 47 of each bridge member being parallel and extend beyond the bottom 41 thereof. The bosses 48 are each formed with trunnion receiving openings 49 that are adapted to be co-axial with the co-axial openings 25 in the trunnion block 5 when the bridge members 40 are seated therein.

It will be noted, in Figs. 2 and 3, that the trunnion supports 47 are spaced from the faces 24 of the trunnion block 5 a distance equal to the width of the bosses on the arms 3 and 4 of the joint members 1 and 2. The bridge members 40 when seated in the channels 27 are by virtue of their shape the nipple connection 30-45, and the extension 34 of the bottom of the channels 28, prevented from any longitudinal or transverse movement therein. The extensions 34 serve further to reinforce the overhanging portions and the trunnion supports 47 of the bridge members.

Mounted between the trunnion block 5 and the trunnion supports 47 at one end of the block are the arms 3 of the joint element 1, while similarly mounted between the block and the other trunnion supports 47 are the arms 4 of the joint element 2. Trunnions 6 extend through each of the trunnion supports and arms into the block 5, and are rigidly secured therein by the threaded connection provided in the openings 25 and at the ends of the trunnions. To lock the trunnions 6 in place there is provided a lock washer 50 beneath each of the heads 51 of the trunnions 6. It is to be understood that other methods may be employed for securing the trunnions 6 in the block 5, as for example by press fitting the same in place.

Each trunnion is provided with a longitudinal bore 55 communicating with a transverse bore 56, the outlet which is in the roller bearing 16 as clearly shown in Figs. 2 and 3, said bores 55 being each in registry with a passage 32 to conduct lubricant to the roller bearings 16.

Disposed within the packing chamber 14 on each side of the roller bearing 16 in each of the arms 3, 3 and 4, 4 is a spring pressed packing construction 57 comprising a spring thrust ring 58 and packing ring 59 of any suitable material such as cork, felt etc. The spring thrust ring 58 is of the type disclosed in my Patent No. 1,929,009, dated October 3, 1933 and comprises an annular channel shaped ring provided with outstruck spring fingers 60, said spring ring being so disposed on each side of the roller bearing that the spring fingers 60 abut the outer raceway and bottom wall of the packing chamber 14, as best shown in Fig. 3. The packing rings 59 are located outwardly of the spring rings 58 the construction of the packing assembly being such that the spring fingers 60 are substantially entirely compressed to exert the maximum possible pressure on the packing ring 59 which as will be observed abuts the face 24 of the trunnion block 5 and the inside face of the trunnion support 47, for each bearing joint. In operation the bearings 16 are each flooded with lubricant received from the reservoirs 43, the packing construction functioning to maintain a substantially fluid tight seal. In time, however, as is well known, a certain amount of lubricant will exude through the packing rings 59 which amount is normally sufficient to obtain sufficient lubrication at the sides of the arms, trunnion block and trunnion support to take care of the relative movement between the arms and the block and trunnion supports. If desired, a metallic graphite impregnated washer such as 61 may be fitted in the trunnion block faces 24 and in the inside faces of the trunnion supports 47, to engage the packing rings 59 so as to increase the degree of lubrication between the aforesaid relatively movable parts.

The joint member 2 which is adapted to be connected to the drive or propeller shaft 65 is provided with an internally splined sleeve 66 which is welded as at 67 to the shank 17 of the joint member 2. Longitudinally movable within the splined sleeve is the splined end 68 of the drive shaft 65, which cooperates therewith for torque transmission in the manner well known.

Closing the open end of the splined sleeve 66 is a cap 70 having confined therewithin a packing ring 71, washer 72, and spring thrust ring 73 similar to the spring ring 58 employed in the packing 57, all cooperating in the establishment of a fluid tight seal at this point.

In order to supply lubricant to this splined connection it has been customary to provide a lubricant fitting on the splined sleeve to convey lubricant therewithin. To dispense with this fitting and method of lubrication there is provided in the herein described universal joint, a lubricant conduit in one of the arms of the joint element 2 that communicates with the lubricant reservoirs 43. This construction is shown in detail in Fig. 3. The arm 4 is provided with the drilled passages or bores 75, 76, 77 and 78, the outer ends of the passages 75, 76 and 77 being closed respectively by the plugs 79, 80 and 81. The passage 75 which runs longitudinally of the arm 4 communicates with an opening 85 provided in the raceway 86 of the roller bearing 16. If desired, additional passages 86 may be provided to communicate the interior of the bearing joint with the passage 75. While both the passages 85 and 86 have been shown it is to be understood that one or the other may be employed alone if so desired. It is thus obvious that the lubricant in the bearing joint is thus able to flow through the passages 85, 86 into the passages 75, 76, 77 and 78, into the splined connection. If desired a similar passage construction may be provided in the other arm 4 of the joint element 2.

To control the supply of lubricant in the splined connection and to prevent the building up of excess pressures in the lubricant there is provided a plunger 90 fixedly secured centrally in the end of the splined portion 68 of the drive shaft 65. Formed on the plunger 90 is a piston like head 91 that cooperates with an opening 92 provided at the end of the passage 78 in the shank 17. Intermediate the ends of this opening 92 is formed an annular recess 93 of a diameter considerably greater than the opening 92. In the outermost position of the splined end 68, see Fig. 2, the head 91 of the plunger is seated in the outer end of the opening 92, preventing flow of lubricant into the splines connection. Inward movement of the plunger will move the head 91 into the recess 93 see Fig. 3, permitting lubricant to flow around the same into the splined connection, as well as equalizing the pressure on the lubricant on each side of the head 91 and preventing the creation of excess pressure upon the inward movement of the splined end 68 in the splined sleeve 66 during operating movements of the universal joint. In the position of the plunger 90 shown in Fig. 3, lubricant will flow into the splined connection if the supply of lubricant therein is insufficient, or back through the arm passages into the reservoirs 43 if the splined connection is completely filled with lubricant. It is to be understood that this automatic plunger 90 may be entirely dispensed with if desired, the lubricant then flowing directly into the splined connection.

Figure 7:
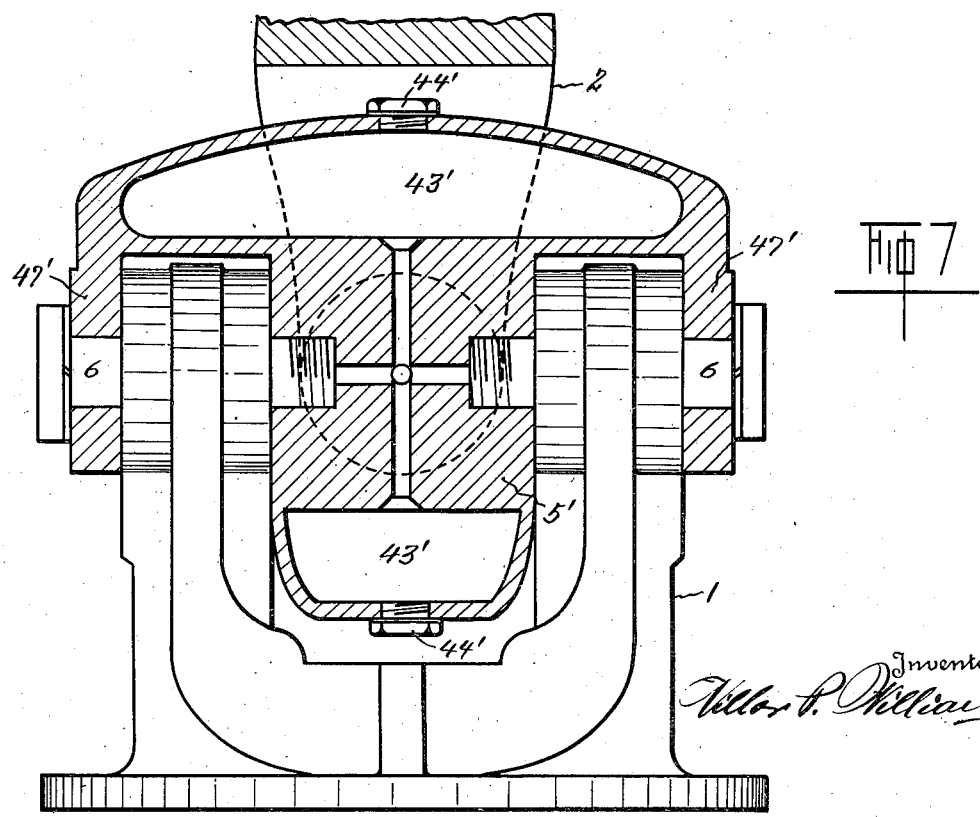
Fig. 7 is a sectional view similar to that of Fig. 2 showing a modified form of construction.

In some cases it may be found desirable to form the bridge members 40 integrally with the trunnion block 5. Such a construction is shown in Fig. 7. The trunnion block 5' is shown as a single unitary casting provided with a reservoir 43' at each end thereof, each reservoir being provided with a filler plug 44'. However both in the showing of Fig. 2 and that of Fig. 7 only one filler plug may be employed on one reservoir in view of the inter-communication of the passages and both reservoirs. Integrally formed at each end of the reservoirs 43' are the trunnion supports 47', the construction of the block 5' being otherwise identical in all respects with the trunnion block 5.

Referring to the showing in Fig. 2 it will be noted as hereinabove described, that the trunnions 6 are each supported at their inner and outer ends respectively by the trunnion block 5 and trunnion supports 47. In view of this two point support of each of the trunnions 6, the stresses imposed upon the trunnions in the operation of the universal joint are considerably diminished as heretofore in joints of this type the trunnions were only supported at one end, that is in the block. In effect the trunnions in the present case each function as a beam rigidly supported at both ends, rather than as a cantilever beam which is only supported at one end. In view of this construction it is accordingly possible to use a trunnion of much smaller diameter as a result of which it becomes possible to increase the dimensions as well as the strength of the cooperating arms, trunnion block and trunnion supports.

In the operation of a universal joint of the four point contact type, the arms of the joint elements tend to spread apart. This tendency becoming greater, the greater the angularity at which the joint operates. In this invention as above described this tendency of the arms to separate is entirely done away with by the employment of the bridge member 40 and cooperating trunnion supports 47, which span each pair of arms of the joint elements 1 and 2. It is obvious that the trunnion supports 47 which snugly span the arms, positively restrain any separation of the arms, thus considerably increasing the strength and efficiency of the universal joint as well as permitting the same to operate at an angularity as much as 45°, see Fig. 1, from each side of the longitudinal axis of the joint. The trunnion supports 47 of the bridge members 40 also function to take up end thrust in the operation of the joint when subjected to extreme torque.

While in the above detailed description and in the drawings the universal joint has been shown preferably for use in automotive vehicles in conjunction with the drive shafts, it must be understood that said universal joint may equally as well be used for other commercial purposes. Such use of the universal joint involves merely changes in the manner of attaching the joint elements 1 and 2 to the ends of associated shafts and I desire it to be distinctly understood that the universal joint as herein described is not to be limited for use in automotive vehicles.

It is to be further understood that in the universal joint as herein disclosed, various changes in the construction and arrangement of the several parts shown and described may be employed without departing from the spirit of my invention as disclosed in the appended claims.

I claim:—

1. In a universal joint, opposed joint elements each formed with a pair of spaced arms, a trunnion block provided with a lubricant reservoir at each end, trunnion supports associated with the ends of said block and each spaced from a face thereof to receive therebetween an arm of a joint element, trunnions for connecting the arms to the block, each trunnion intermediate the ends thereof supporting an associated arm, the inner ends of said trunnions being mounted in the block and the outer ends thereof in the trunnion supports, and conduit means communicating said reservoirs with said trunnions.

2. The universal joint as specified in claim 1, one of said joint elements having a splined connection with an associated shaft, and a lubricant conduit in at least one of the arms of said joint member communicating said splined connection with said conduit means.

3. In a universal joint, opposed joint elements each formed with a pair of spaced arms, a trunnion block provided with a lubricant reservoir at each end, trunnion supports associated with the ends of said block and each spaced from a face thereof to receive therebetween an arm of a joint element, trunnions for connecting the arms to the block, each trunnion intermediate the ends thereof providing a bearing support for an associated arm, a bearing in each arm, spring pressed packing means disposed in said arms on each side of said bearing and abutting opposed faces of said block and associated trunnion support, the inner ends of said trunnions being mounted in said block and the outer ends in said trunnion supports, and conduit means communicating said reservoirs with said bearings.

4. In a universal joint, joint elements each formed with a pair of spaced arms arranged in planes at right angles to each other, a trunnion block disposed between said arms, a bridge member formed with a trunnion support at each end thereof carried on each end of said block and each arranged to span a pair of arms of a joint member, trunnions connecting the arms to the block, each trunnion intermediate the ends thereof supporting an associated arm, the inner ends of said trunnions being mounted in the block and the outer ends thereof in the trunnion supports.

5. In a universal joint, joint elements each formed with a pair of spaced arms arranged in planes at right angles to each other, a trunnion block disposed between said arms, a hollow bridge member defining a lubricant reservoir formed with spaced trunnion supports carried on each end of said block and arranged to span a pair of arms of a joint member, trunnions connecting the arms to the block, each trunnion intermediate the ends thereof supporting an associated arm, the inner ends of said trunnions being mounted in the block and the outer ends thereof in the trunnion supports, and means communicating said reservoirs with said trunnions.

6. In a universal joint, a trunnion block, spaced walls extending from each end thereof and defining an open channel, said channels being arranged at right angles with respect to each other, and a combined lubricant container and reinforcing member seated in each channel.

7. In a universal joint, a trunnion block, a channel formed at each end thereof, a trunnion receiving opening at each side of said block, a separable lubricant reservoir seated in each of said channels, and lubricant conducting means communicating each of said reservoirs with said trunnion receiving openings.

8. In a universal joint, a trunnion block, a trunnion receiving opening at each side thereof, individual lubricant reservoirs arranged one at each end of the block, lubricant conducting means communicating each of said reservoirs with said trunnion receiving openings, and trunnion supports carried by said block and arranged in spaced relation to each of the faces thereof.

9. In a universal joint, a trunnion block, a channel formed on each end of said block and arranged at right angles to each other, a bridge element seated in each of said channels, depending trunnion supports provided at the end of each bridge element and arranged in spaced relation to the faces of said block.

10. In a universal joint, a trunnion block, a channel formed on each end of said block and arranged at right angles to each other, a hollow bridge element defining a lubricant reservoir seated in each of said channels, depending trunnion supports provided at the end of each bridge element and arranged in spaced relation to the faces of said block, and lubricant conducting means communicating each of said reservoirs with the interior of said trunnion block.

11. In a universal joint, a substantially four sided trunnion block provided on each face thereof with trunnion receiving openings, a trunnion support spaced from each of said block faces and integral with said block, the trunnion supports opposite opposed faces of said block being arranged at right angles to the trunnion supports opposite the other opposed faces of said block, each of said trunnion supports having a trunnion receiving opening registering with the trunnion receiving openings in said block.

12. In a universal joint, a substantially four sided trunnion block, a pair of trunnion supports associated with one end of said block and spaced from one pair of opposed faces, a pair of trunnion supports associated with the other end of said block and spaced from the other pair of opposed faces, said trunnion supports extending towards and arranged at right angles to each other.

13. In a universal joint, a substantially four sided trunnion block, a lubricant reservoir formed at each end of said block, trunnion supports integrally formed with said block adjacent the ends of said reservoirs and spaced from the faces of said block, the trunnion supports adjacent the ends of one reservoir extending towards and arranged at right angles to the trunnion supports adjacent the ends of the other reservoir.

14. In a universal joint, a joint element comprising a pair of arms each having a trunnion receiving opening at the end thereof, and a bridge element spanning said arms provided with portions overlapping the outer faces of said arms said portions being each formed with trunnion receiving openings registering with the openings in said arms.

15. In a universal joint, a joint element comprising a pair of arms, bearing means carried by each of said arms, a bridge element spanning said arms and provided with portions overlapping the outer faces of said arms, said portions being each formed with openings adapted to receive said bearing means.

16. In a universal joint, a joint element comprising a pair of arms each having a trunnion receiving opening at the end thereof, a bridge element spanning said arms provided with portions overlapping the outer faces of said arms, said portions being each provided with trunnion receiving openings registering with the openings in said arms, and bearing means mounted in the openings of one of said elements.

17. In a universal joint, a joint element comprising a pair of parallel arms, a bridge element spanning the ends of said arms and provided with parallel portions overlapping the outer faces of said arms, and trunnions non-rotatably mounted in one of said elements and having oscillatory bearing engagement with the other of said elements.

18. In a universal joint, a joint element comprising a pair of spaced arms each provided with a trunnion receiving opening at the end thereof, bearing means mounted in each of said openings, a spring pressed packing means disposed on each side of said bearing means, said packing in operative position being flush with the faces of each of said arms and the spring of each packing means being disposed between said bearing means and said packing.

19. In a universal joint, a trunnion block, a separable lubricant container arranged at each end of said trunnion block, a lubricant discharge nipple carried by each of said containers adapted to seat within coacting openings provided therefor in said trunnion block and communicating said lubricant containers with the interior of said trunnion block.

20. In a universal joint, a trunnion block having at each end thereof a channel extending from side to side of said block, the channel at one end of said block being arranged at right angles to the channel at the other end of said block, a trunnion receiving opening at each side of said block, and lubricant passages within said block communicating each of said trunnion receiving openings with a lubricant nipple positioned in the bottom of at least one of said channels.

21. The structure as specified in claim 20, a lubricant reservoir seated in each of said channels, one of said reservoirs adapted to have secured thereto said lubricant nipple.

22. The structure as specified in claim 20, a U-shaped trunnion supporting and reinforcing member seated in each of said channels, at least one of said members being provided with an opening adapted to receive said lubricant nipple.

23. In a universal joint, opposed joint elements each formed with a pair of spaced arms, a trunnion block disposed between and in confronting relation with each of said arms, trunnions operatively connecting each of said arms with said block and extending outwardly of each of said arms, means individual to each pair of arms integral with said block and adapted to support the outwardly extending portions of said trunnions, said means additionally restraining separation of the arms of the pair associated therewith during torque transmission between the joint elements.

24. The structure as specified in claim 4, each arm being provided on each side thereof with a recessed packing chamber co-axial with the trunnion assocated therewith, a spring pressed packing means disposed in each chamber, said packing in operative position being flush with the faces of each of said arms and bearing on opposed faces of said block and bridge member.

25. In a universal joint, opposed joint elements each formed with a pair of spaced arms, a trunnion block disposed between and in confronting relation with each of said arms, trunnions operatively connecting each of said arms with said block and extending outwardly of each of said arms, means associated with the block and overlapping each pair of arms to restrain separation thereof during torque transmission, and adapted to support the outwardly extending portions of said trunnions.

VILLOR P. WILLIAMS.